United States Patent
King et al.

(10) Patent No.: US 6,888,497 B2
(45) Date of Patent: May 3, 2005

(54) METHOD AND MOBILE STATION FOR DETERMINING A CODE PHASE

(75) Inventors: Thomas M. King, Tempe, AZ (US); George J. Geier, Scottsdale, AZ (US)

(73) Assignee: Motorola, Inc., Schaumburg, IL (US)

( * ) Notice: Subject to any disclaimer, the term of this patent is extended or adjusted under 35 U.S.C. 154(b) by 12 days.

(21) Appl. No.: 10/330,571

(22) Filed: Dec. 27, 2002

(65) Prior Publication Data

US 2004/0125015 A1 Jul. 1, 2004

(51) Int. Cl.$^7$ ................................................ C01S 5/14
(52) U.S. Cl. ................................ 342/357.12; 342/378
(58) Field of Search ........................... 342/357.06, 378, 342/357.12; 701/213

(56) References Cited

U.S. PATENT DOCUMENTS

| | | | |
|---|---|---|---|
| 5,414,729 A | 5/1995 | Fenton | |
| 5,459,473 A | 10/1995 | Dempster et al. | |
| 5,633,255 A | 5/1997 | Bigg et al. | |
| 6,133,873 A | 10/2000 | Krasner | |
| 6,633,255 B2 | 10/2003 | Krasner | |
| 6,633,814 B2 * | 10/2003 | Kohli et al. | 701/213 |

* cited by examiner

*Primary Examiner*—Gregory C. Issing
(74) *Attorney, Agent, or Firm*—Marshall, Gerstein & Borun LLP

(57) ABSTRACT

A method (500) and a mobile station (160) for determining a code phase are described herein. The mobile station (160) may generate a first auto correlation function (ACF) associated with correlation samples over a range of code phases corresponding to a line-of-sight signal. The mobile station (160) may generate a second ACF within the mobile station based on measured correlation samples over a range of code phases. The mobile station (160) may compare the first ACF to the second ACF to generate a code phase offset between the first and second ACFs. The mobile station (160) may adjust the first ACF to match the second ACF.

34 Claims, 5 Drawing Sheets

METHOD AND MOBILE STATION FOR DETERMINING A CODE PHASE

TECHNICAL FIELD

The present disclosure relates to wireless communication systems, and more particularly, to a method and a mobile station for determining a code phase.

BACKGROUND

Wireless communication service providers offer many location-based services such as emergency services, mobile yellow pages, and navigation assistance to subscribers. In fact, service providers will be required to accurately locate subscribers requesting emergency assistance via 911 to comply with the regulations of the United States Federal Communications Commission (FCC) known as Enhanced 911 (E-911). To determine the location of a mobile station (e.g., a cellular telephone, a pager, or a handheld computer), a Global Positioning System (GPS) receiver can be used. In a GPS application, the location of the mobile station may be determined by using range information derived from the code phase corresponding to the peak of an auto correlation function (ACF). The ACF may be generated by correlating a received signal with a local replica of a pseudorandom code modulated on a carrier signal transmitted by from GPS satellites.

Typically, a conventional GPS receiver determines the code phase offset based on historical information. That is, the GPS receiver tracks pseudorandom codes from GPS satellites (i.e., satellite signals). Then, the GPS receiver compares a correlation magnitude derived using an earlier version of its replica code with a correlation magnitude derived using a later version of its replica code. The difference between the two correlation magnitudes is used to close a tracking loop (generally known as a delay lock loop (DLL)) to keep the code phase estimate as close as possible to the peak of the ACF. Based on the code phase estimate, and a means to resolve the integer ambiguity associated with the code (i.e., the number of integer pseudorandom code lengths between the receiver and each satellite), position of the mobile station (i.e., latitude, longitude, and/or altitude) may be calculated. However, the GPS receiver may not be implemented within the mobile station because the GPS receiver consumes a significant amount of power to continuously track the pseudorandom codes from satellites. The battery of the mobile station cannot support such power consumption and also provide power to the mobile station for other standard operations. For cellular terrestrial positioning based on code phases that are derived from correlations with known bit sequences, power consumption is not an issue because the bursts used normally occur in cellular messaging. However, current positioning methods cannot provide an accurate and reliable code phase estimate corresponding to the peak of a sampled ACF.

In a cellular-based application such as Enhanced Observed Time Difference (EOTD) used in Global System for Mobile communication (GSM) based networks and Advanced Forward Link Trilateration (AFLT) used in code division multiple access (CDMA) based networks, range information may be derived from cellular signals and used to determine the location of the mobile station. The code phase of a selected burst sequence corresponding to the peak of an ACF provides the range information.

One aspect of designing a wireless communication system is to optimize resources available to a mobile station. In particular, one method of improving availability of resources within the mobile station is to conserve power and to extend battery life. Therefore, a need exists for an effective means to determine the location of the mobile station without significant increase in power consumption.

BRIEF DESCRIPTION OF THE DRAWINGS

This disclosure will describe several embodiments to illustrate its broad teachings. Reference is also made to the attached drawings.

DETAILED DESCRIPTION

Figure 1:
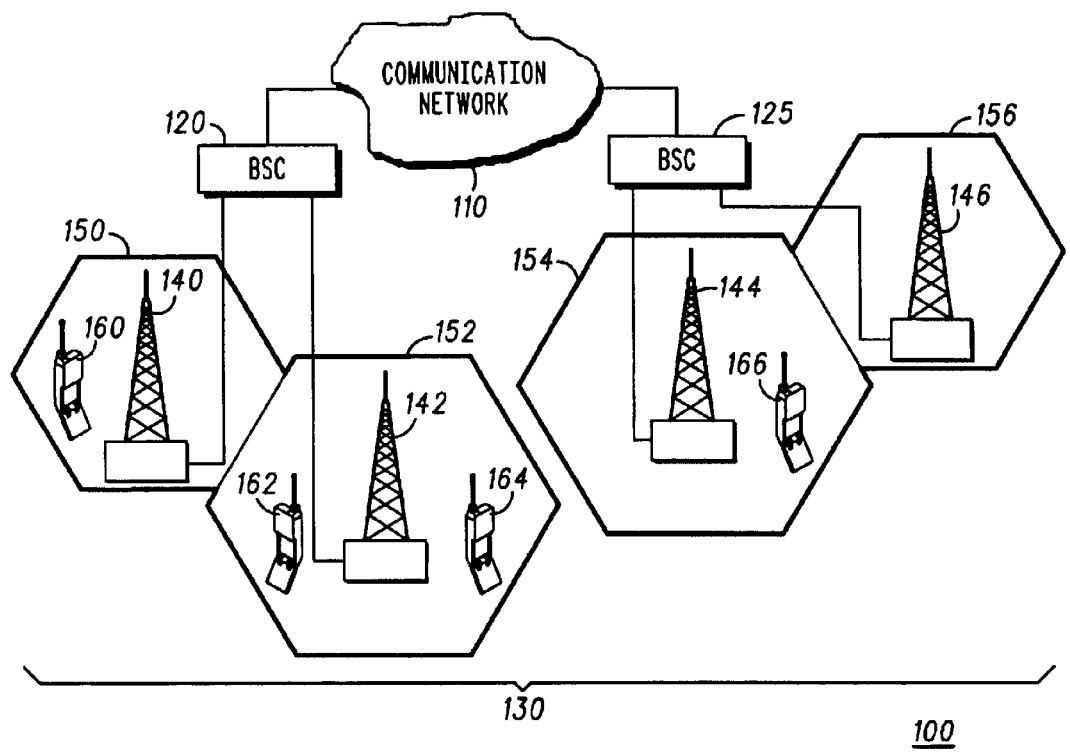
FIG. 1 is a block diagram representation of a wireless communication system.

A method and a mobile station for determining a code phase are described. The mobile station may generate a first auto correlation function (ACF) associated with correlation samples over a range of code phases corresponding to a line-of-sight signal. The first ACF may be, but is not limited to, an ideal ACF (i.e., a model curve) such as an infinite-bandwidth triangular ACF curve, a one-size-fits-all (OSFA) ACF curve based on a bandwidth or an OSFA ACF curve based on averaged measurements from a plurality of signals with measured correlations that are expected to approach those of an ideal ACF. For example, a receiving unit within the mobile station may be configured to measure correlation samples from a satellite such as a global positioning system (GPS) satellite or a base station. Accordingly, such signals correspond to receptions from high elevation satellites without obstruction. As another example, such signals correspond to receptions in a clear environment with no or minimal multi-path reflections in cellular systems. The mobile station may also generate a second ACF based on measured correlation samples over a range of code phases. For example, the mobile station may measure correlation samples from GPS satellites and/or base stations.

Upon generating the second ACF, the mobile station may compare the first ACF to the second ACF to generate a code phase offset between the first and second ACFs. The code phase offset may include at least one code phase adjustment. Using the first ACF (i.e., ideal representation) and the second ACF (i.e., measured representation), the mobile station may determine a code phase by producing a best fit between the first ACF and the second ACF. In particular, the mobile station may adjust the first ACF so that the at least one code phase adjustment exceeds a minimum threshold to determine the code phase. For example, the mobile station may provide at least one code phase adjustment to an initial code phase to determine a final code phase. The initial code phase is a code phase corresponding to a peak magnitude associated with the second ACF. The final code phase includes the initial code phase and the code phase offset (i.e., a number of code phase adjustments). The mobile station may also provide at least one magnitude adjustment to the peak magnitude associated with the first ACF to determine the final code phase, which in turn, may be used to determine a pseudo-range measurement and/or a time-of-arrival measurement.

Further, the mobile station may determine a residual between the first and second ACFs at one of the plurality of measured correlation samples to more accurately determine the code phase. To illustrate this concept, the mobile station may compare the squared value of the residual to a predetermined noise variance to generate a residual factor (or normalized residual) associated with the one of the plurality of measured correlation samples. The sum of the residual factors across the plurality of measured correlation samples may be used to determine a weight factor. This weight factor, if it exceeds a first threshold, may result in the deweighting of the code phase resulting from the ACF matching in the location solution (i.e., the Weighted Least Squares solution for position from the set of code phases converted to ranging information). Further, if the weight factor exceeds a second threshold, which is larger than the first threshold, the code phase resulting from the ACF matching will be removed from the set of code phases used in the navigation solution. For example, if the weight factor associated with a code phase far exceeds the interference caused by noise, the mobile station may entirely disregard the code phase when determining the mobile location. Alternatively, the mobile station may determine the code phase based on measured correlation samples over an interval less than the code phase interval or a range less than the range of code phases in response to the weight factor being greater than a third residual threshold. When the mobile station may not generate code phases from a sufficient number of satellites or base stations, for example, the mobile station may not discard any code phase and still compute a location of the mobile station. As a result, the mobile station may either determine the code phase based on measured correlation samples over an interval less than the code phase interval or a range less than the range of code phases to improve the code phase corresponding to the excessive weight factor.

Although the embodiments disclosed herein are particularly well suited for use with a cellular telephone and a pager, persons of ordinary skill in the art will readily appreciate that the teachings of this disclosure are in no way limited to those devices. On the contrary, persons of ordinary skill in the art will readily appreciate that the teachings of this disclosure can be employed with other wireless communication devices such as a personal digital assistants (PDAs) and handheld computers.

A communication system in accordance with the present disclosure is described in terms of several preferred embodiments, and particularly, in terms of a wireless communication system operating in accordance with at least one of several standards. These standards include analog, digital or dual-mode communication system protocols such as, but not limited to, the Advanced Mobile Phone System (AMPS), the Narrowband Advanced Mobile Phone System (NAMPS), the Global System for Mobile Communications (GSM), the IS-55 Time Division Multiple Access (TDMA) digital cellular, the IS-95 Code Division Multiple Access (CDMA) digital cellular, the CDMA 2000 system, the Wideband CDMA (W-CDMA) system, the Personal Communications System (PCS), the Third Generation (3G) system, the Universal Mobile Telecommunications System (UMTS) and variations and evolutions of these protocols. The wireless communication system is a complex network of systems and elements. Typical systems and elements include (1) a radio link to mobile stations (e.g., a cellular telephone or a subscriber equipment used to access the wireless communication system), which is usually provided by at least one and typically several base stations, (2) communication links between the base stations, (3) a controller, typically one or more base station controllers or centralized base station controllers (BSC/CBSC), to control communication between and to manage the operation and interaction of the base stations, (4) a switching system, typically including a mobile switching center (MSC), to perform call processing within the system, and (5) a link to the land line, i.e., the public switch telephone network (PSTN) or the integrated services digital network (ISDN).

A base station subsystem (BSS) or a radio access network (RAN), which typically includes one or more base station controllers and a plurality of base stations, provides all of the radio-related functions. The base station controller provides all the control functions and physical links between the switching system and the base stations. The base station controller is also a high-capacity switch that provides functions such as handover, cell configuration, and control of radio frequency (RF) power levels in the base stations.

The base station handles the radio interface to the mobile station. The base station includes the radio equipment (transceivers, antennas, amplifiers, etc.) needed to service each communication cell in the system. A group of base stations is controlled by a base station controller. Thus, the base station controller operates in conjunction with the base station as part of the base station subsystem to provide the mobile station with real-time voice, data, and multimedia services (e.g., a call).

Referring to FIG. 1, a wireless communication system 100 includes a communication network 110, and a plurality of base station controllers (BSC), generally shown as 120 and 125, servicing a total service area 130. As is known for such systems, each BSC 120 and 125 has associated therewith a plurality of base stations (BS), generally shown as 140, 142, 144, and 146, servicing communication cells, generally shown as 150, 152, 154, and 156, within the total service area 130. The BSCs 120 and 122, and base stations 140, 142, 144, and 146 are specified and operate in accordance with the applicable standard or standards for providing wireless communication services to mobile stations (MS), generally shown as 160, 162, 164, and 166, operating in communication cells 150, 152, 154, and 156, and each of these elements are commercially available from Motorola, Inc. of Schaumburg, Ill.

Figure 2:
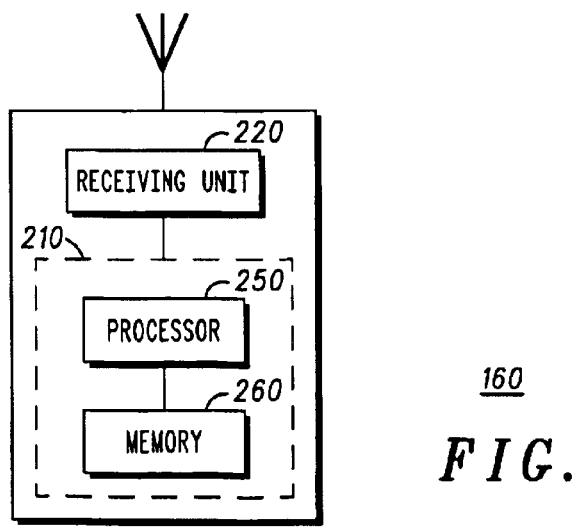
FIG. 2 is a block diagram representation of a mobile station.

Referring to FIG. 2, a mobile station (one shown as 160 in FIG. 1) adapted to determine a code phase is shown. The mobile station 160 generally includes a controller 210, and a receiving unit 220. The controller 210 includes a processor 250 and a memory 260. The processor 250 is operatively coupled to the memory 260, which stores a program or a set of operating instructions for the processor 250. The processor 250 executes the program or the set of operating instructions such that the mobile station 160 operates as described herein. The program of the set of operating instructions may be embodied in a computer-readable medium such as, but not limited to, paper, a programmable gate array, an application specific integrated circuit (ASIC), an erasable programmable read only memory (EPROM), a read only memory (ROM), a random access memory (RAM), a magnetic media, and an optical media. Further, the controller 210 is operatively coupled to the receiving unit 220. For example, the receiving unit 220 may be, but is not limited to, a global positioning system (GPS) receiver operable to receive position information from a GPS satellite. The receiving unit 220 may be configured to generate auto correlation functions (ACFs), which in turn, may be used to determine code phases (i.e., to perform a correlation function over a specific range of code phases and Doppler estimates). In a cellular application (e.g., enhanced observed time difference) as another example, the receiving unit 220 may be configured to perform functions of acquisition, tracking, and demodulation of cellular signals that include demodulated bits associated with known portions of cellular messages (e.g., normal bursts in GSM systems), which are used to generate ACFs.

A basic flow for determining a code phase that may be applied with the mobile station 160 shown in FIG. 2 may start with generating an ideal ACF. The ideal ACF may be a predetermined ACF (generated by the manufacturer of the mobile station 160). For example, the ideal ACF may be based on an analytic prediction of distortion to a theoretical ACF such as a triangular function for GPS or a previously measured ACF for a strong signal (i.e., a signal from an overhead satellite). When previously measured ACF values are used to generate the ACF, the measured data may be generated over a period of time to reduce the effects of noise in the measured correlation samples. The ideal ACF may be symmetrical about its peak (one shown as 310 in FIG. 3). A Least Squares (LS) approach or a Weighted Least Squares (WLS) approach may be used to generate a mathematical model for the ideal ACF, which may be a set of polynomial coefficients from the measured correlation samples. A low pass filter or a Kalman filter may be used to combine coefficient estimates derived from the measured correlation samples that are separated in time.

The receiving unit 220 may be activated to generate the measured ACF samples to extract information necessary to determine code phase and position. The mobile station 160 may receive signals from a plurality of satellites. In a GPS application, for example, the receiving unit 220 may receive three signals from satellites in-view of the receiving unit 220. Based on the three signals, the receiving unit 220 may determine a location. Accordingly, a minimum of three sets of measured ACF samples may be generated by the mobile station 160. Alternatively in an EOTD application, the receiving unit 220 may receive signals from at least three base stations (e.g., shown as 140, 142, and 144 in FIG. 1) to generate the measured ACF samples.

Upon receiving a sufficient number of measured ACF samples, the receiving unit 220 may be deactivated (i.e., turned off) to conserve power of the mobile station 160. In a GPS application, the measured ACF samples may be derived through noncoherent integration, and a bias level known as a noise floor may be included in the sampled values. The noise floor my be removed from the measured ACF samples before the mobile station 160 compares the measured ACF samples to the ideal ACF samples. Further, the noise floor may be used to estimate the noise variance associated with the measured ACF samples. The ideal ACF may be shifted in code phase offset, and its peak value may be scaled until a match with the measured ACF is reached (i.e., a best fit). The best fit may be determined by either an LS process or a WLS process. The adjustments made to the code phase offset may represent a code phase measurement. As a result, the code phase measurement may then be converted into pseudo-range measurements for calculating a location (e.g., a GPS fix) as persons of ordinary skill in the art will readily recognize.

Figure 3:
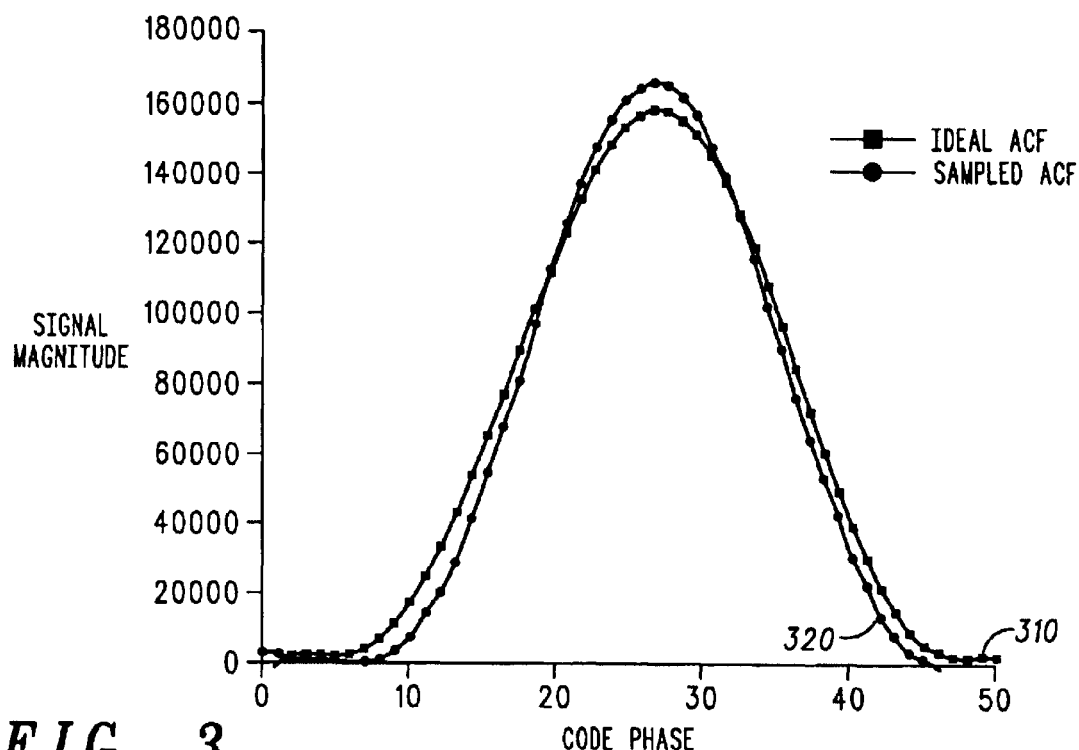
FIGS. 3, 4, 5, 6, 7, and 8 are plot diagram representations of auto correlation functions (ACFs).
Figure 4:
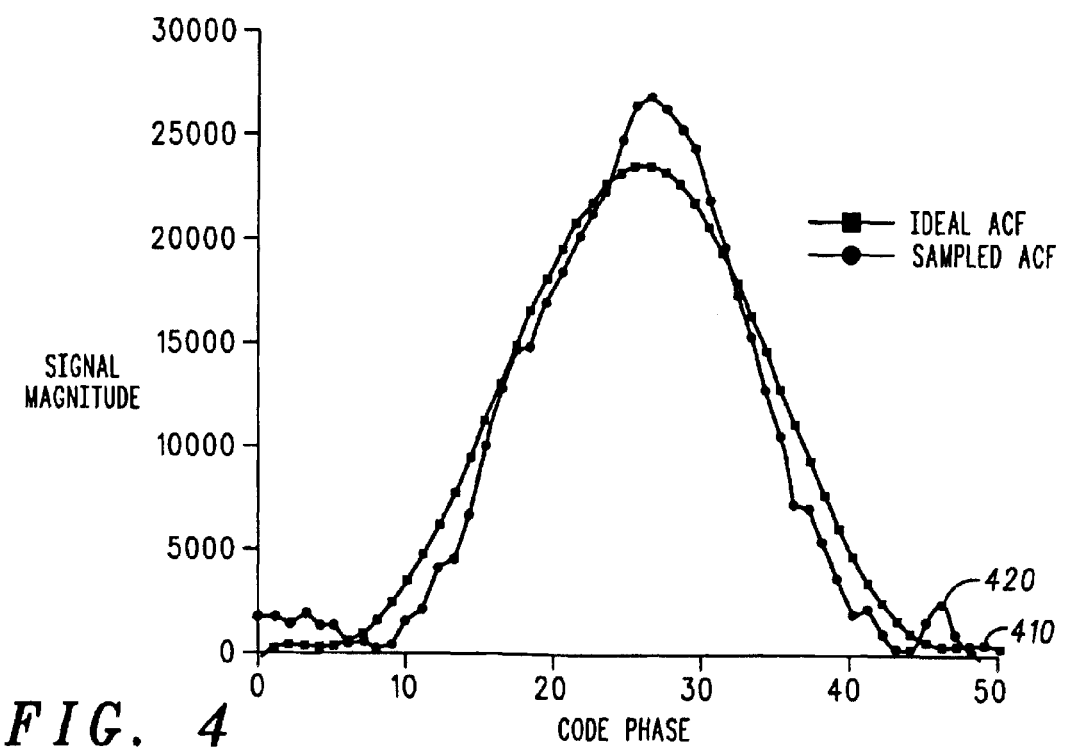

Referring to FIG. 3, a sampled ACF 320 based on a relatively strong GPS signal may substantially overlap the ideal ACF 310. Typically, for example, a relatively strong GPS signal may originate from satellites that are substantially directly above of the receiving unit 220 (i.e., within the lines-of-sight of the receiving unit 220). In contrast, a sampled ACF 420 based on a weak GPS signal (e.g., a multipath signal) may deviate from the ideal ACF 410 as shown in FIG. 4. For example, obstructions such as, but not limited to, trees and buildings, may interfere with signals from low satellites (i.e., near the horizon). Although the spacing interval of the ACFs shown in FIGS. 3 and 4 may be 0.05 chip, persons of ordinary skill in the art will readily appreciate that the teachings of this disclosure are in no way limited to such an increment. The magnitude and frequency content of the differences between the "best fit" of the ideal ACF and the measured ACF samples may be used as a quality indicator for the resulting correlation sample (i.e., a pseudo-range measurement in a GPS application or a time-of-arrival measurement in an EOTD application). In methods to calculate position with an error variance assigned to each measurement such as a WLS method, the difference information may be used as a component or a scale factor applied to the error variance of a noise error variance of each measured correlation sample. In a WLS method, for example, a correlation sample with a large residual difference may be "de-weighted" (i.e., a correlation sample producing significant difference between the ideal ACF and the measured ACF). Excessively large differences may be used to remove a code phase from the position calculation. Alternatively, the difference information may be used to interpolate the code phase measurement with measured ACF samples generated with finer or revised sample spacing. For example, using correlation samples on only one side of the ideal ACF in the comparison process may reduce the susceptibility of contaminating the resulting code phase because reflected signals are delayed relative to a line-of-sight (LOS) signal.

Figure 5:
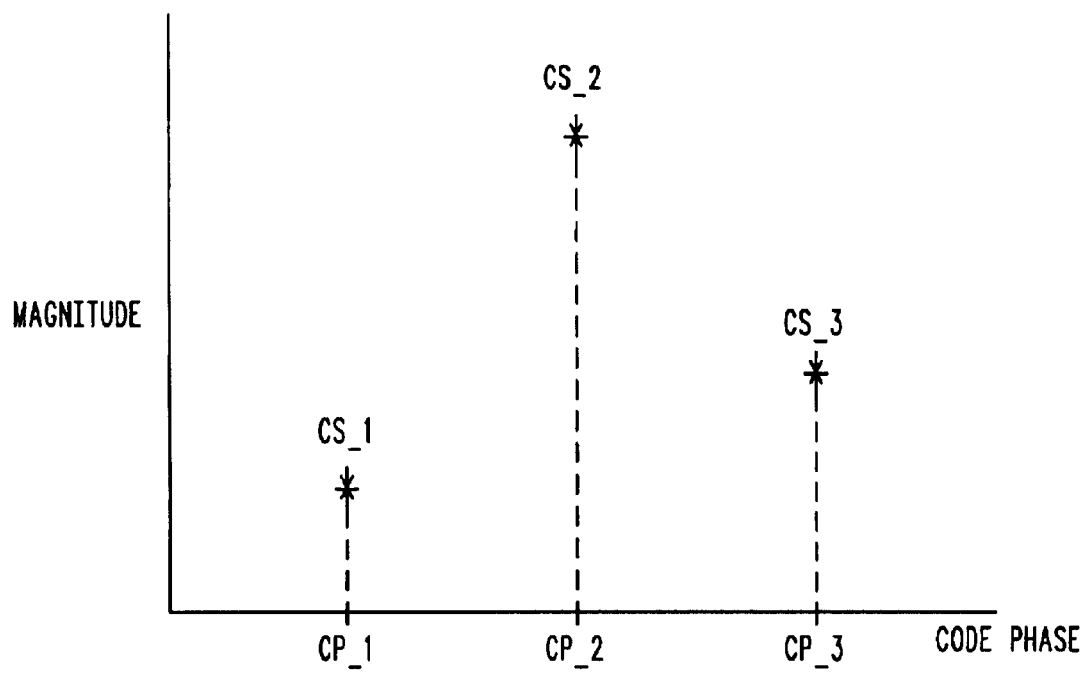

To illustrate the concept of determining a code phase that may be applied to the mobile station 160 shown in FIG. 2, the receiving unit 220 may measure for a plurality of correlation samples, generally shown as CS_1, CS_2, and CS_3 in FIG. 5. In particular, the receiving unit 220 may measure for the plurality of correlation samples based on a code phase interval (e.g., 0.5 chip). That is, CP_1 may be the code phase value of CP_2−0.5 chips whereas CP_3 may be the code phase value of CP_2+0.5 chips. Each correlation samples may include a code phase value and a magnitude value. The receiving unit 220 may measure more correlation samples as shown in FIGS. 3 and 4 by using a smaller code phase interval (e.g., 0.05 chip). Upon measuring a plurality of correlation samples, the mobile station 160 may generate a second ACF.

Figure 6:
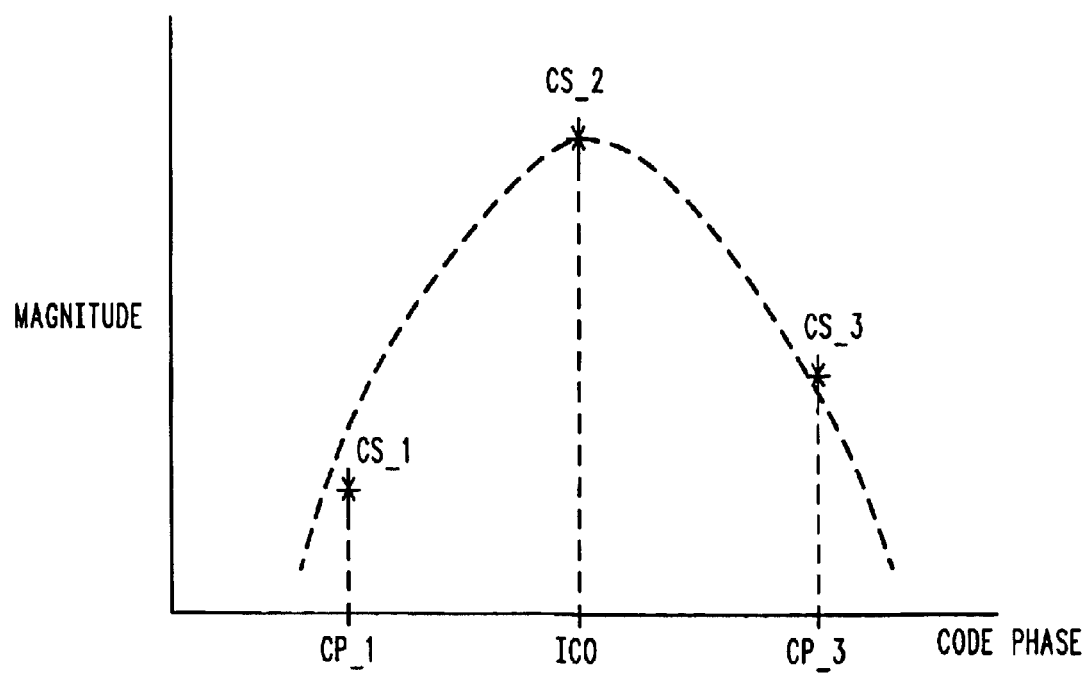

Referring to FIG. 6, the mobile station 160 may compare the second ACF to the first ACF to determine a code phase offset. As noted above, the first ACF may be, but is not limited to, an infinite-bandwidth triangular ACF curve, a one-size-fits-all (OSFA) ACF curve based on a bandwidth, and an OSFA ACF curve based on averaged measurements over a period of time. Here, the first ACF matches the second ACF at the code phase CP_2, which may be the initial code phase ICO. That is, the initial code phase ICO corresponds to a code phase where the peak of the first ACF directly matches the peak of second ACF (i.e., CS_2). However, the first ACF and the second ACF do not match at the code phases CP_1 and CP_3. As a result, the mobile station 160 may adjust the code phase offset CPO.

Figure 7:
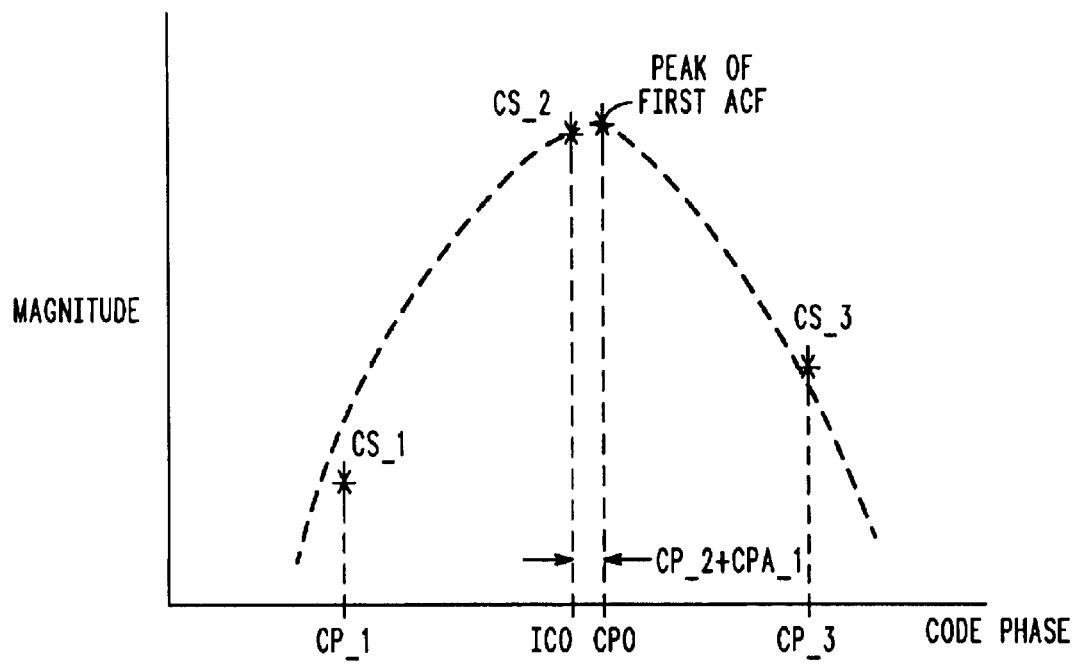

Referring to FIG. 7, for example, the mobile station 160 may shift the first ACF to the right by a first code phase adjustment CPA_1 on a first iteration. Here, the code phase offset CPO only includes the first code phase adjustment CPA_1. Further, the first ACF may match directly to the second ACF at the code phase CP_1. However, the first ACF may not match directly to the second ACF at the code phase CP_3.

Figure 8:
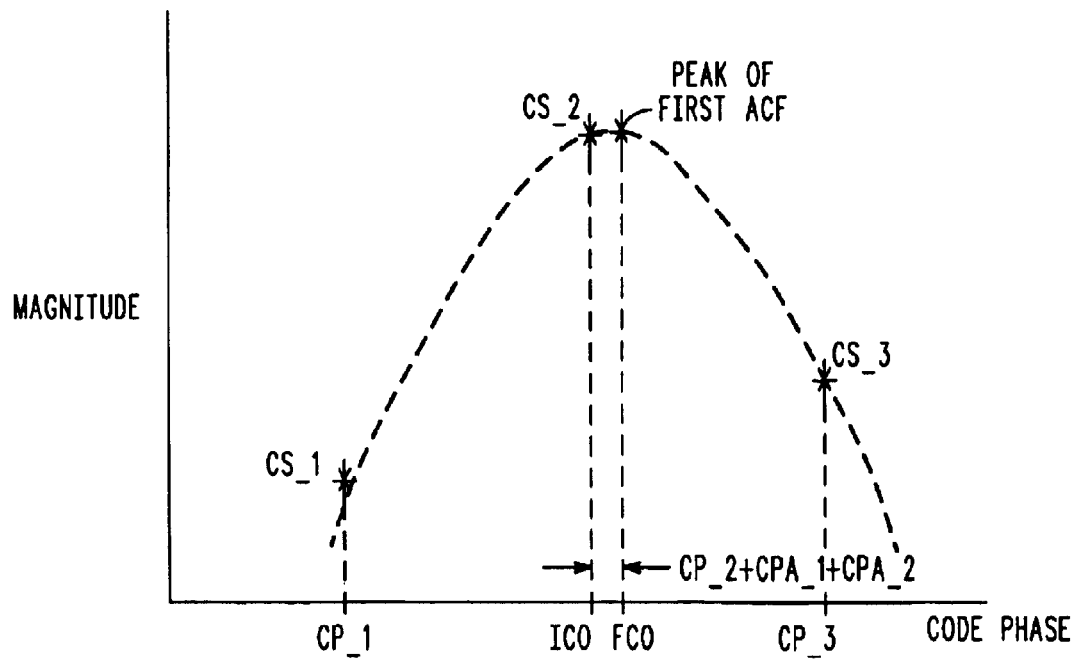

To provide an accurate code phase offset CPO, the mobile station 160 may further shift the first ACF to the right by a second code phase adjustment CPA_2 on a second iteration as shown in FIG. 8. Here, the code phase offset CPO includes the first code phase adjustment CPA_1 and the second code phase adjustment CPA_2. If the current phase adjustment (i.e., CPA_2 in this example) is equal to or less than a minimum threshold assigned to the code phase adjustment, then the mobile station 160 may determine a final code phase FCO, which in turn, may be used to determine a pseudo-range measurement or a time-of-arrival measurement as persons of ordinary skill will readily recognize. Otherwise, the mobile station 160 may continue to adjust the code phase offset CPO until the code phase adjustment is less than the minimum threshold. The mobile station 160 may perform a number of iterations to optimize the first ACF to match the second ACF such that the sum of the squares of the residuals (or the weighted sum of the squares for a WLS approach) between the first and second ACFs at the correlation samples of CS_1, CS_2, and CS_3 is minimal. That is, the first and second ACFs may not perfectly match at any one of the correlation samples of CS_1, CS_2, and CS_3 but the sum of the squares of the residuals between the first and second ACFs (or the weighted sum of the squares for a WLS approach) may be minimized. Alternatively, the mobile station 160 may adjust the first ACF for a number of times to match the second ACF. For example, the mobile station 160 may adjust the first ACF for three times to match the second ACF. Further, the mobile station 160 may also shift the first ACF up or down to match the first ACF to the second ACF. As a result, the mobile station 160 may provide a more accurate final code phase FCO.

Figure 9:
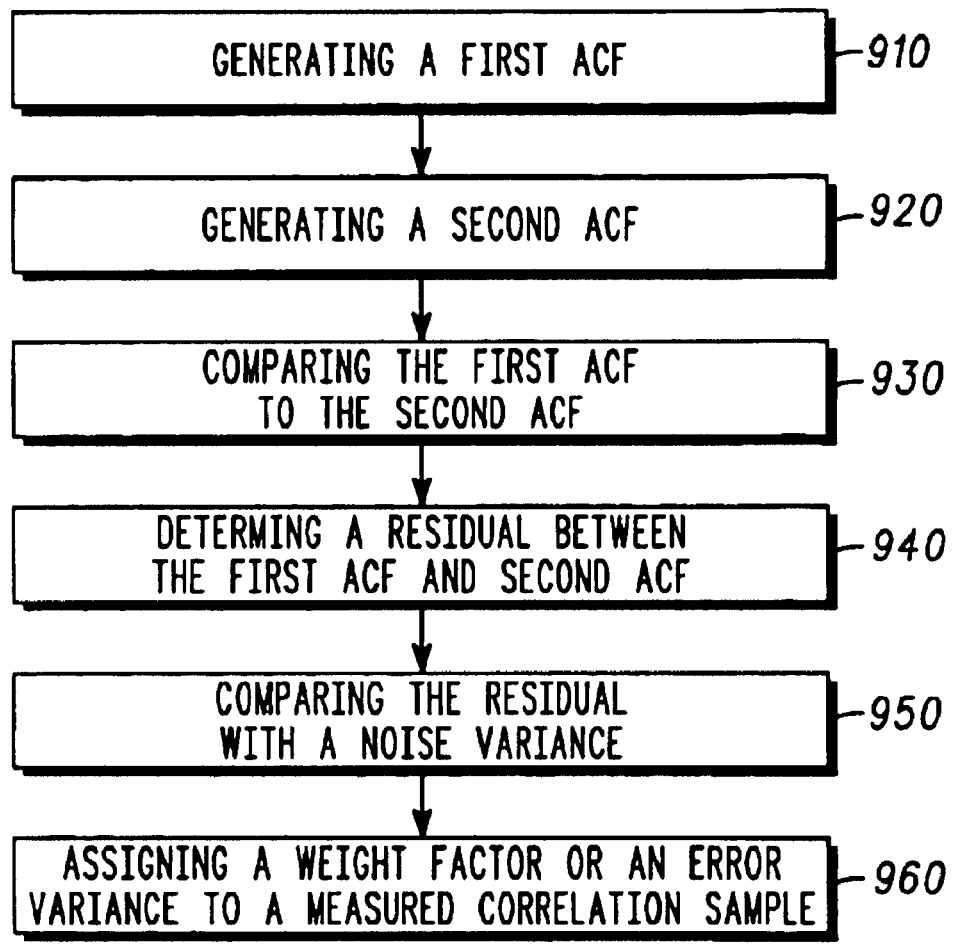
FIG. 9 is a flow diagram illustrating a method for determining a code phase.

One possible implementation of the computer program executed by the mobile station 160 (e.g., via the processor 350) is illustrated in FIG. 9. Persons of ordinary skill in the art will appreciate that the computer program can be implemented in any of many different ways utilizing any of many different programming codes stored on any of many computer-readable mediums such as a volatile or nonvolatile memory or other mass storage device (e.g., a floppy disk, a compact disc (CD), and a digital versatile disc (DVD)). Thus, although a particular order of steps is illustrated in FIG. 9, persons of ordinary skill in the art will appreciate that these steps can be performed in other temporal sequences. Again, the flow chart 900 is merely provided as an example of one way to program the mobile station 160 to determine a code phase used to calculate either pseudo-range measurements in a GPS application or time-of-arrival measurements in an EOTD application to determine the location of the mobile station 160. The flow chart 900 begins at step 910, wherein the mobile station 160 may generate a first auto correlation function (ACF) based on correlation samples over a range of code phases corresponding to a line-of-sight (LOS) signal. The first ACF may be, but is not limited to, an ideal ACF such as an infinite-bandwidth triangular ACF curve, a one-size-fits-all (OSFA) ACF curve based on a bandwidth, and an OSFA ACF curve based on averaged measurements of strong LOS signals from satellites in a GPS application or base stations in an EOTD application. As noted above, the ideal ACF may be represented mathematically in the form of polynomial coefficients corresponding to a predetermined order to a particular accuracy level. At step 920, the mobile station may generate a second ACF, which may include measured correlation samples over the range of code phases. To generate the measured correlation samples, a noise floor (i.e., a bias level associated with the samples) may be subtracted from each sampled value. The noise floor may be used to derive an estimate of a noise variance associated with the measured correlation samples. The mobile station at step 930 may adjust the first ACF until the first ACF matches the second ACF ("best fit"). That is, the first ACF may be shifted in code phase (e.g., in units of chip) and scaled in magnitude to match the second ACF. When the first ACF matches the second ACF, the code phase may be converted into a pseudo-range measurement used in GPS fix computations as persons of ordinary skill in the art will readily recognize. Similarly, the code phase may be converted into a time-of-arrival estimate in an EOTD application. Further, an estimate of a noise variance in the second ACF may be determined based on the noise floor associated with the second ACF. The noise variance may be used to assign an error variance associated with the code phase through a mathematical representation of the matching process (i.e., an LS process or a WLS process). Alternatively, the mobile station may adjust the first ACF for a number of times to match the second ACF (e.g., three iterations to generate the code phase offset). At step 940, the mobile station may determine a difference between the first and second ACFs (i.e., a residual). The difference may represent a measure of the quality of the fit. The difference may also be used as a weighting factor in a process to determine the location of the mobile station. The mobile station at step 950 may compare the correlation sample noise variance computed from the noise floor (i.e., a threshold) to the sum of the squares of the residuals of the matched ACF. Based on the comparison, the mobile station at step 960 may assign a weight factor or an error variance to the code phase. For example, the difference may be of a magnitude that the code phase may be excluded from the process to determine the location of the mobile station (i.e., the code phase corresponds to a weighting factor of zero).

Although the embodiments disclosed herein are particularly well suited for use with a GPS application, persons of ordinary skill in the art will readily appreciate that the teachings of this disclosure are in no way limited to such application. On the contrary, persons of ordinary skill in the art will readily appreciate that the teachings of this disclosure can be employed with other applications such as a cellular application.

Many changes and modifications to the embodiments described herein could be made. The scope of some changes is discussed above. The scope of others will become apparent from the appended claims.

What is claimed is:

1. In a wireless communication system, a method for determining a code phase, the method comprising:

generating a first auto correlation function (ACF) within the mobile station, the first ACF being associated with correlation samples over a range of code phases corresponding to a line-of-sight signal;

generating a second ACF within the mobile station based on measured correlation samples over a range of code phases;

comparing the first ACF to the second ACF to generate a code phase offset and a weight factor; and applying the weight factor to the code phase when combining the code phase with a second code phase from another transmitter.

2. The method of claim 1, wherein the step of generating a first ACF within the mobile station comprises generating an ideal ACF, the ideal ACF being one of an infinite-bandwidth triangular ACF curve, an one-size-fits-all (OSFA) ACF curve based on a bandwidth, and an OSFA ACF curve based on averaged measurements over a period of time.

3. The method of claim 1, further comprising:
adjusting the first ACF to match the second ACF.

4. The method of claim 3 wherein the adjusting the first ACF to match the second ACF comprises adjusting the first ACF to match the second ACF so that a least one of plurality of code phase adjustments exceeds a minimum threshold.

5. The method of claim 3, wherein the step of adjusting the first ACF to match the second ACF comprises adjusting the first ACF for a number of times to match the second ACF.

6. The method of claim 3, wherein the step of adjusting the first ACF to match the second ACF comprises providing at least one code phase adjustment to a first code phase to determine a second code phase, and wherein the first code phase corresponds to a peak magnitude associated with the second ACF.

7. The method of claim 3, wherein the step of adjusting the first ACF to match the second ACF comprises providing at least one magnitude adjustment to an initial peak to determine a code phase, and wherein the initial peak is a peak magnitude associated with the first ACF.

8. The method of claim 3, wherein step of adjusting the first ACF to match the second ACF comprises:
determining a residual between the first and second ACFs at one of the measured correlation samples;
comparing the residual to a noise variance to generate a plurality of residual factors, each of the plurality of residual factors being associated with one of the plurality of measured correlation samples;
determining a weight factor from the plurality of residual factors;
deweighting a final code phase in response to the weight factor exceeding a first threshold, the final code phase being associated with a location calculation of the mobile station;
removing the final code phase from use in the location calculation in response to the weight factor exceeding a second threshold, the second threshold being greater than the first threshold; and
determining the code phase based on measured correlation samples over one of an interval less than the code phase interval and a range less than the range of code phases in response to the weight factor being greater than a third threshold.

9. The method of claim 1, wherein the communication system comprises one of a code division multiple access (CDMA) based communication system and a time division multiple access (TDMA) based communication system.

10. In a wireless communication system, a mobile station for determining a code phase, the mobile station comprising:
a receiving unit configured to measure correlations over a range of code phases;
a controller operatively coupled to the receiving unit, the controller having a memory and a processor operatively coupled to the memory,
the controller being programmed to generate a first auto correlation function (ACF) within the mobile station, the first ACF being associated with correlations over a range of code phases corresponding to a line-of-sight signal;
the controller being programmed to generate a second ACF within the mobile station based on measured correlation samples over a range of code phases;
the controller being programmed to compare the first ACF to the second ACF to generate a code phase offset and a weight factor; and
the controller being programmed to apply the weight factor to the code phase when combining with a second code phase from another transmitter.

11. The mobile station of claim 10, wherein the receiving unit is a global positioning system (GPS) receiver.

12. The mobile station of claim 10, wherein the first ACF is an ideal ACF, the ideal ACF being one of an infinite-bandwidth triangular ACF curve, an one-size-fits-all (OSFA) ACF curve based on a bandwidth, an OSFA ACF curve based on averaged measurements over a period of time.

13. The mobile station of claim 10, wherein the code phase is associated with one of a pseudo-range measurement and a time-of-arrival measurement.

14. The mobile station of claim 10, wherein the controller is programmed to adjust the first ACF to match the second ACF so that the code phase offset exceeds a minimum threshold.

15. The mobile station of claim 10, wherein the controller is programmed to adjust the first ACF for a number of times to match the second ACF.

16. The mobile station of claim 10, wherein the controller is programmed to adjust the first ACF, the adjustment made by one of a magnitude adjustment and a code phase adjustment.

17. The mobile station of claim 10, wherein the controller is programmed to determine a residual between the first and second ACFs at one of the plurality of measured correlation samples,
the controller is programmed to compare the residual to a noise variance to generate a plurality of residual factors associated with one of the plurality of measured correlation samples,
the controller is programmed to determine the weight factor from the plurality of residual factors,
the controller is programmed to deweight a final code phase in response to the weight factor exceeding a first threshold, the final code phase being associated with a location calculation of the mobile station,
the controller is programmed to remove the final code phase from use in the location calculation in response to the weight factor exceeding a second threshold, the second threshold being greater than the first threshold, and
the controller is programmed to determine the code phase based on measured correlation samples over one of an interval less than the code phase interval and a range less than the range of code phases in response to the weight factor being greater than a third threshold.

18. The mobile station of claim 10 is operable in accordance with one of a code division multiple access (CDMA) based communication system and a time division multiple access (TDMA) based communication system.

19. In a wireless communication system, wherein a processor operates in accordance with a computer program embodied on a computer-readable medium for determining a code phase, the computer program comprising:
a first routine that directs the processor to generate a first auto correlation function (ACF) within the mobile station, the first ACF being associated with correlation samples over a range of code phases corresponding to a line-of-sight signal;
a second routine that directs the processor to generate a second ACF within the mobile station based on measured correlation samples over a range of code phases;
a third routine that directs the processor to compare the first ACF to the second ACF to generate a code phase offset and a weight factor; and a fourth routine that directs the processor to apply the weight factor to the code phase when combining with a second code phase from another transmitter.

20. The computer program of claim 19, wherein the first routine comprises a routine that directs the processor to generate an ideal ACF, the ideal ACF being one of an infinite-bandwidth triangular ACF curve, an one-size-fits-all (OSFA) ACF curve based on a bandwidth, and an OSFA ACF curve based on averaged measurements over a period of time.

21. The computer program of claim 19, further comprising a fifth routine that comprises a routine that directs the processor to adjust the first ACF to match the second ACF so that a code phase adjustment exceeds a minimum threshold to determine the code phase.

22. The computer program of claim 21, wherein the fifth routine comprises a routine that directs the processor to adjust the first ACF for a number of times to match the second ACF.

23. The computer program of claim 21, wherein the fifth routine comprises a routine that directs the processor to adjust the first ACF so that the code phase offset determines the code phase associated with one of a pseudo-range measurement and a time-of-arrival measurement.

24. The computer program of claim 21, wherein the fifth routine comprises a routine that directs the processor to provide at least one code phase adjustment to a first code phase to determine a second code phase, and wherein the first code phase corresponds to a peak magnitude associated with the second ACF.

25. The computer program of claim 21, wherein the fifth routine comprises a routine that directs the processor to provide at least one magnitude adjustment to an initial peak to determine a code phase, and wherein the initial peak is the peak magnitude associated with the first ACF.

26. The computer program of claim 21, wherein the fifth routine comprises:

a routine that directs the processor to determine a residual between the first and second ACFs at one of the plurality of measured correlation samples, a routine that directs the processor to compare the residual to a noise variance to generate a plurality of residual factors associated with one of the plurality of measured correlation samples, a routine that directs the processor to determine the weight factor from the plurality of residual factors, a routine that directs the processor to deweight a final code phase in response to the weight factor exceeding a first threshold, the final code phase being associated with a location calculation of the mobile station, a routine that directs the processor to remove the final code phase from use in the location calculation in response to the weight factor exceeding a second threshold, the second threshold being greater than the first threshold, and a routine that directs the processor to determine the code phase based on measured correlation samples over one of an interval less than the code phase interval and a range less than the range, of code phases in response to the weight factor being greater than a third threshold.

27. The computer program of claim 19 is operable in accordance with one of a code division multiple access (CDMA) based communication protocol and a time division multiple access (TDMA) based communication protocol.

28. The computer program of claim 19, wherein the medium is one of paper, a programmable gate array, application specific integrated circuit, erasable programmable read only memory, read only memory, random access memory, magnetic media, and optical media.

29. In a wireless communication system, a device for determining a code phase, the device comprising:

a means for generating a first auto correlation function (ACF) within the mobile station, the first ACF being associated with correlation samples over a range of code phases corresponding to a line-of-sight signal;

a means for generating a second ACF within the mobile station based on a plurality of measured correlation samples over a range of code phases;

a means for comparing the first ACF to the second ACF to generate a code phase offset between the first and second ACFs, the code phase offset having at least one code phase adjustment and a weight factor; and a means for applying the weight factor to the code phase when combining with a second code phase from another transmitter.

30. The device of claim 29, further comprising a means for adjusting the first ACF to match the second ACF so that the at least one code phase adjustment exceeds a minimum threshold to determine the code phase.

31. The device of claim 30, wherein the means for adjusting the first ACF comprises adjusting the first ACF for a number of times to match the second ACF.

32. The device of claim 30, wherein the means for adjusting the first ACF to match the second ACF comprises a means for providing at least one code phase adjustment to a first code phase to determine a second code phase, and wherein the first code phase corresponds to a peak magnitude associated with the second ACF.

33. The device of claim 30, wherein the means for adjusting the first ACF to match the second ACF comprises a means for providing at least one magnitude adjustment to an initial peak to determine a code phase, and wherein the initial peak is a peak magnitude associated with the first ACF.

34. The device of claim 30, wherein the means for adjusting the first ACF to match the second ACF comprises:

a means for determining a residual between the first and second ACFs at one of the plurality of measured correlation samples;

a means for comparing the residual to a noise variance to generate a plurality of residual factors, each of the plurality of residual factors being associated with one of the plurality of measured correlation samples;

a means for determining the weight factor from the plurality of residual factors;

a means for deweighting a final code phase in response to the weight factor exceeding a first threshold, the final code phase being associated with a location calculation of the mobile station;

a means for removing the final code phase from use in the location calculation in response to the weight factor exceeding a second threshold, the second threshold being greater than the first threshold; and a means for determining the code phase based on measured correlation samples over one of an interval less than the code phase interval and a range less than the range of code phases in response to the weight factor being greater than a third threshold.

* * * * *